R. S. WILCOX.
VEHICLE WHEEL.
APPLICATION FILED OCT. 21, 1920.

1,401,845.

Patented Dec. 27, 1921.

Ralph S. Wilcox, INVENTOR,

BY W. C. Carman

ATTORNEY

UNITED STATES PATENT OFFICE.

RALPH S. WILCOX, OF YOUNGSTOWN, OHIO.

VEHICLE-WHEEL.

1,401,845.  Specification of Letters Patent.  Patented Dec. 27, 1921.

Application filed October 21, 1920. Serial No. 418,488.

*To all whom it may concern:*

Be it known that I, RALPH S. WILCOX, a citizen of the United States, residing at Youngstown, in the county of Mahoning and State of Ohio, have invented certain new and useful Improvements in Vehicle-Wheels, of which the following is a specification.

This invention relates to vehicle wheels, designed primarily for automobiles, the object being to produce a wheel in the use of which the pneumatic tire may be dispensed with,—the resiliency being obtained through the medium of what I have termed a "floating" hub, supported, sustained, guided and controlled by a plurality of springs, and an equal number of swinging tubular guide-bars and swinging stems slidably mounted in said guide-bars, interposed between the hub and the rim.

Figure 1:
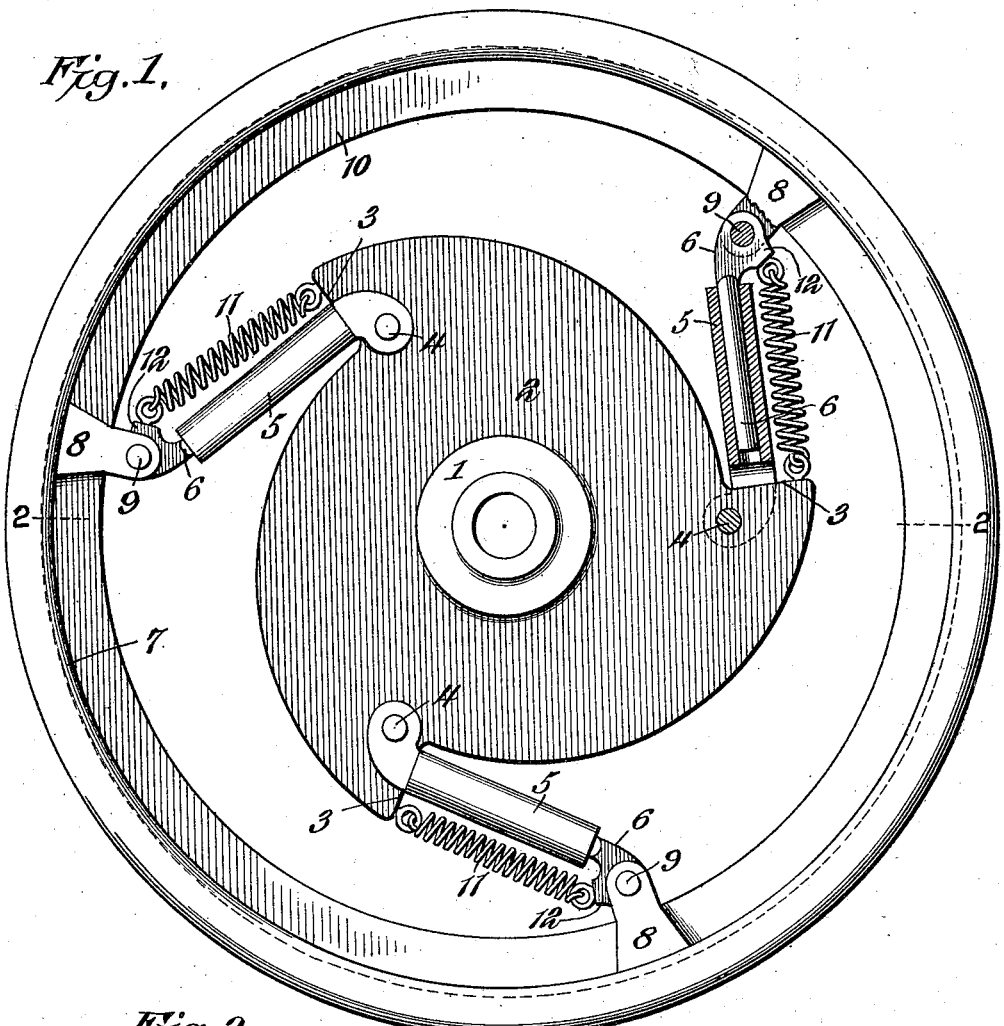
Figure 2:
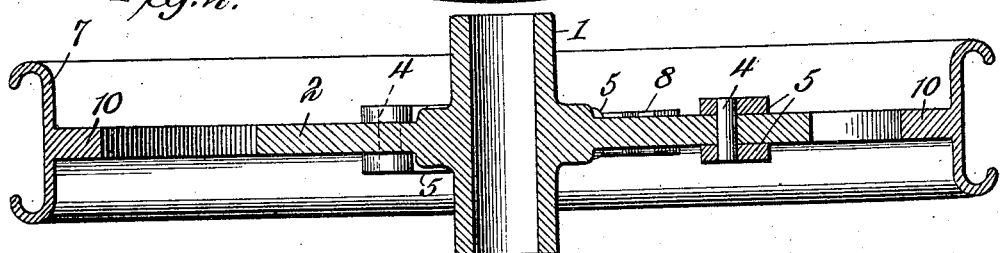

In the accompanying drawings, Figure 1 represents a side elevation, with one of the guide-bars shown in section to disclose the telescopic engagement between the same and its stem, and Fig. 2 is a section through the center of the wheel on line 2—2 Fig. 1.

As suggested above, I employ what I term a "floating" hub 1, having an integrally formed, or rigidly attached, central flange or web member 2, circular in form, except that a portion of each of a plurality of segments is cut-away (the cut-away portion, as shown in the drawings, being substantially of a semi-crescent formation) to form shoulders or abutments 3—3.

Pivotally mounted upon the pin 4 carried by the flange 2, adjacent each of the shoulders or abutments 3, is the hollow or tubular guide-bar 5, which is telescopically engaged by the stem 6 pivotally connected to the rim 7 by means of the bracket 8 and the pin 9. To facilitate, and make secure, the attachment of the bracket 8 to the rim 7, I provide the latter with the inwardly projecting annular flange 10. It is obvious, however, that the bracket may be secured directly to the rim proper by forming an attachment head or flange on the end of the former and bolting it to the latter.

To support the hub normally in its proper position at the center of the rim, I provide a spring 11 for each guide-bar and stem, one end of which is secured to the outer edge of the shoulder or abutment 3, and the other end to the head 12 of the stem 6.

The spring 11 are of sufficient strength to carry the weight of the body and framework of the car, with its load, under normal conditions, thus holding the hub 1 theoretically in the center of the rim, but still leaving the hub free to move radially in any direction from the center, when the wheels come in contact with any obstruction in the road, causing the springs to yield temporarily in the absorption of the shock.

I claim:—

1. A vehicle wheel, comprising a floating or detached hub having a central radial flange member provided with a plurality of circumferentially disposed shoulders in substantially radial alinement to the hub, a tubular guide-bar swingingly mounted adjacent each of said shoulders, an outer rim having a plurality of stems swingingly secured to the inner surface thereof and telescopically engaging said tubular guide-bars, and a contracting coil spring disposed substantially parallel with said guide-bar, one end of said spring being attached to the head of said stem and the other end to the shoulder of said flange.

2. A vehicle wheel, comprising a floating or detached hub having a central radial flange member provided with a plurality of circumferentially disposed shoulders is substantially radial alinement to the hub, a tubular guide-bar swingingly mounted adjacent each of said shoulders, an outer rim having a plurality of stems swingingly secured to the inner surface thereof and telescopically engaging said tubular guide-bars, and a contracting coil spring disposed substantially parallel with said guide-bar, one end of said spring being attached to the head of said stem and the other end to the shoulder of said flange,—said guide-bar, stem and spring being disposed in tangential alinement to said flange.

3. A vehicle wheel, comprising a floating or detached hub having a central radial flange member provided with a plurality of circumferentially disposed shoulders in substantially radial alinement to the hub, a tubular guide-bar swingingly mounted adjacent each of said shoulders, an outer rim having a plurality of stems swingingly secured to the inner surface thereof and telescopically engaging said tubular guide-bars, and a contracting coil spring disposed substantially parallel with said guide-bar, one end of said spring being attached to the head of said stem and the other end to the shoulder of said flange,—said guide-bar, stem and spring being disposed in tangential alinement to said flange, and all extending in the same direction with regard to the circumference of the flange.

In testimony whereof I hereunto affix my signature in the presence of two witnesses.

RALPH S. WILCOX.

Witnesses:
  H. G. BYE,
  B. W. BROCKWAY.